Aug. 18, 1959  H. L. THOLSTRUP  2,900,063
POWER DRIVEN TYPE ACTION FOR CHARACTER-BY-CHARACTER PRINTERS
Original Filed Oct. 4, 1956  6 Sheets-Sheet 1

INVENTOR.
HENRY L. THOLSTRUP
BY
ATTORNEY

INVENTOR.
HENRY L. THOLSTRUP
BY
ATTORNEY

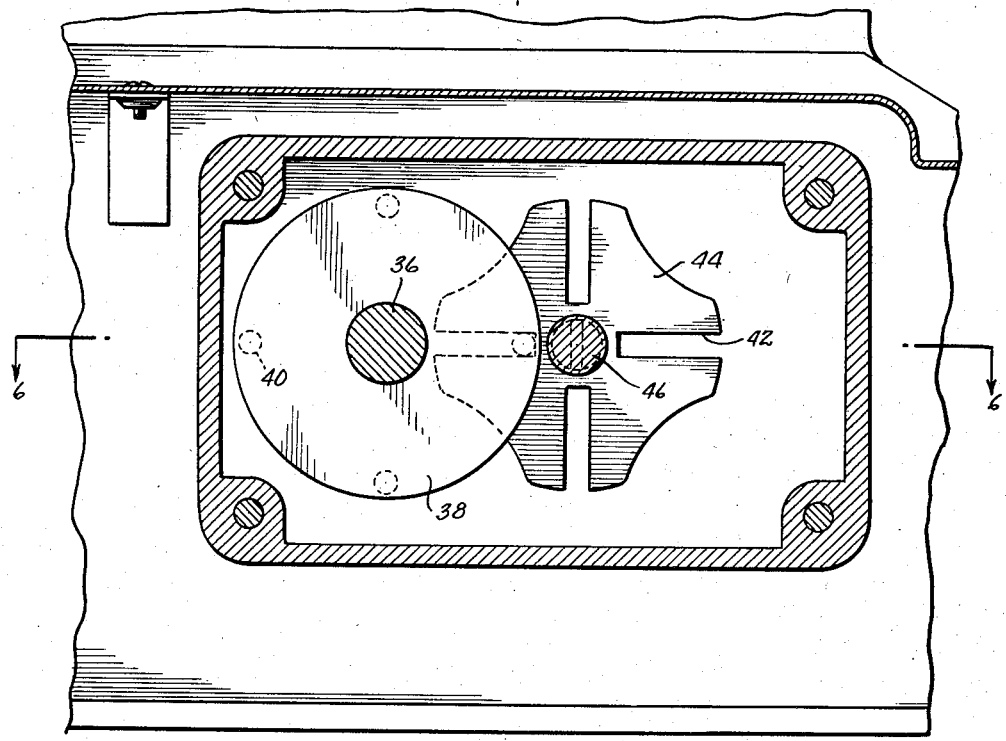
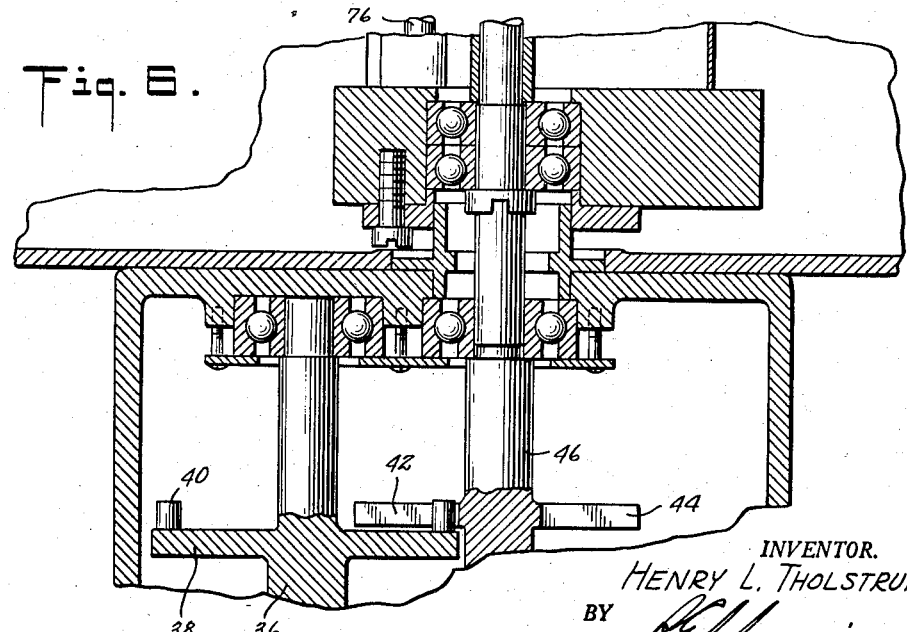

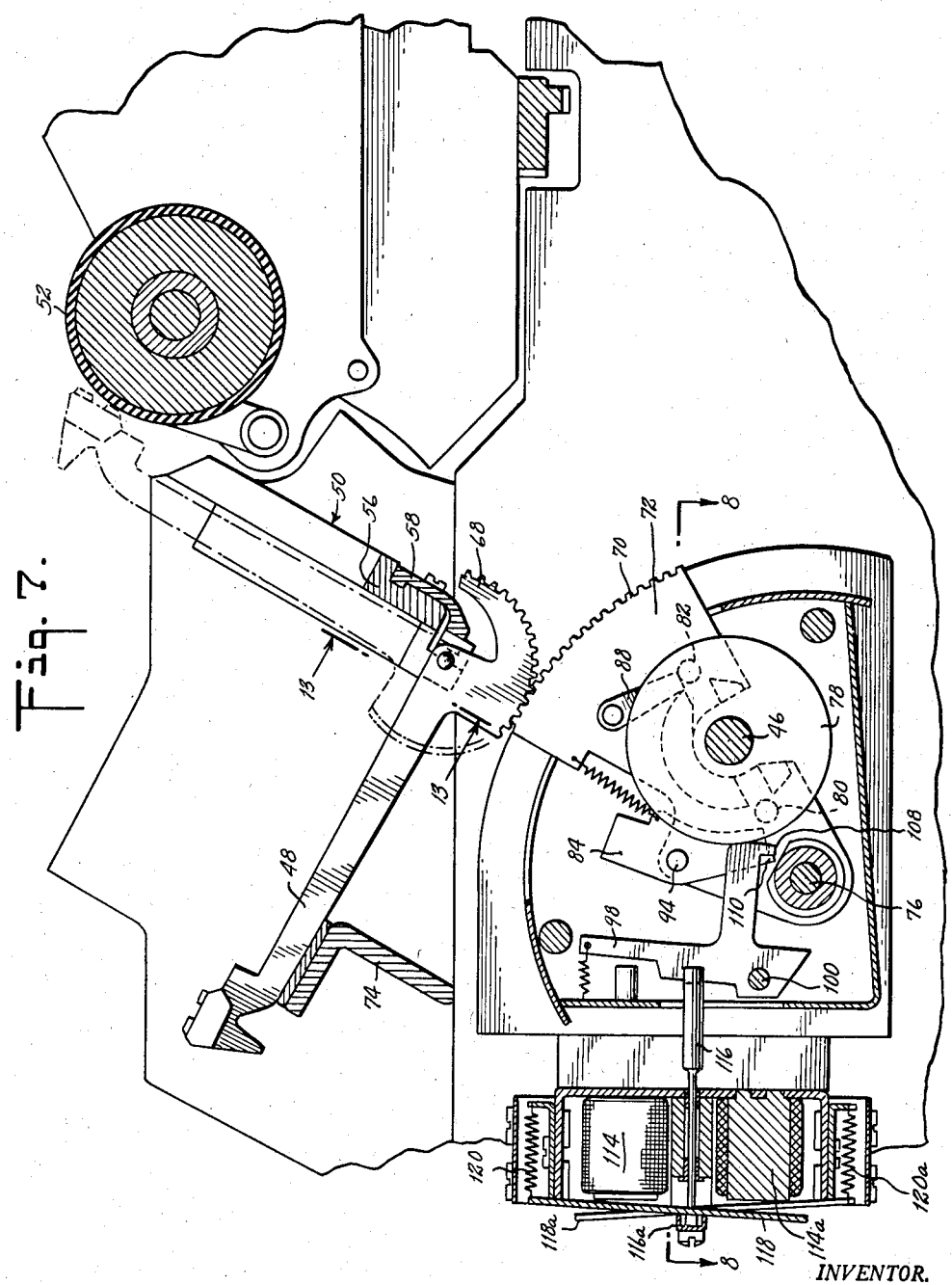

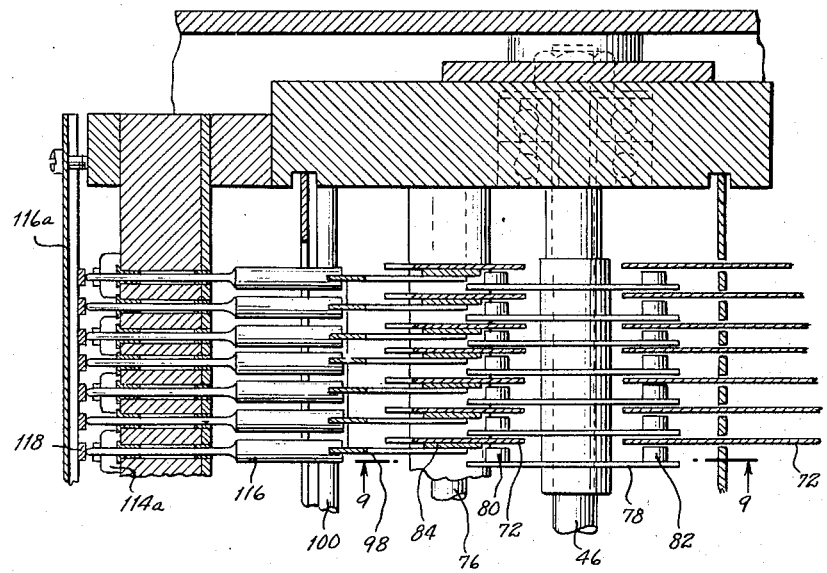
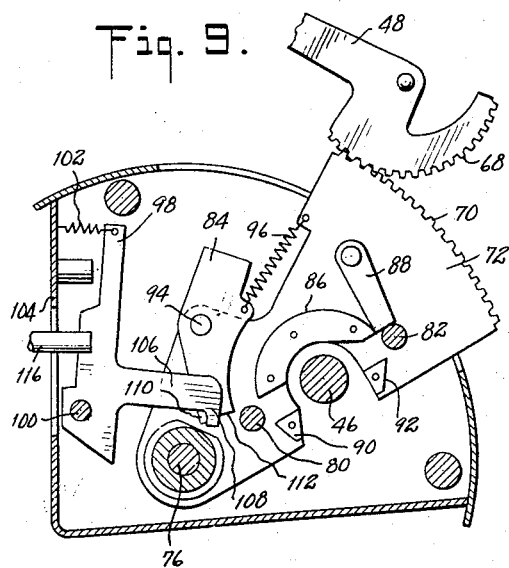
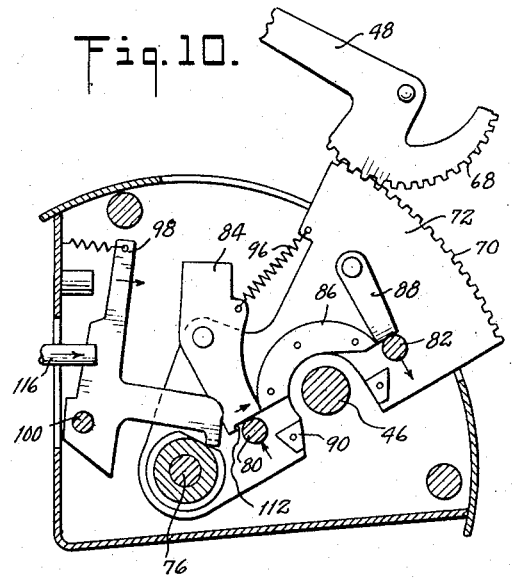

Aug. 18, 1959 H. L. THOLSTRUP 2,900,063
POWER DRIVEN TYPE ACTION FOR CHARACTER-BY-CHARACTER PRINTERS
Original Filed Oct. 4, 1956 6 Sheets-Sheet 6

INVENTOR.
HENRY L. THOLSTRUP
BY
ATTORNEY

2,900,063

POWER DRIVEN TYPE ACTION FOR CHARACTER-BY-CHARACTER PRINTERS

Henry L. Tholstrup, Rochester, N.Y., assignor to Commercial Controls Corporation, Rochester, N.Y., a corporation of Delaware Original application October 4, 1956, Serial No. 613,877. Divided and this application October 2, 1957, Serial No. 687,768

10 Claims. (Cl. 197—17)

This invention relates to a power operated character-by-character printer. This application is a division of my copending application for United States patent, Serial No. 613,877, filed October 4, 1956 for Power Driven Printer.

It is the main object of the invention to provide a printer of the power operated typewriter class, in which the printing operation and the functions attendant thereon are performed at much greater speed than obtainable in machines of the same class now available.

The speed at which a printer of the power operated typewriter class can be operated is dependent upon the time required to perform the various functions of such machines. In the average printer of this class, the type bar speed is 115 milliseconds, the return of the carriage (100 spaces) consumes 575 milliseconds, tabulation (50 spaces) requires 455 milliseconds, case shifting consumes 85 milliseconds, and a back spacing operation can be performed in no less than 125 milliseconds with the result that the average copy can be composed at a maximum rate of not more than 12 characters per second. Simply to increase the speed of such conventional printers, considering kinetic energies involved, would merely increase the frequency of service calls and shorten the ultimate life of the machine.

It is, therefore, the object of this invention to provide a printer which may be operated at much higher speed than heretofore possible without imposing still higher impact loads on the type bars and greater strain on other moving functional parts.

The objectives of the invention are accomplished by providing a positive drive for the type levers, carriage, etc., thus overcoming acceleration lags inherent in machines in which type lever action is merely power initiated and in which the return movement is under the influence of gravity or light spring tension, or in which carriage movement is merely under control of springs. This invention concerns itself particularly with the positive drive mechanism for the type action.

By providing mechanism for the positive movement of the type levers in both directions, the printer herein has an average type bar speed of only 40 milliseconds with the result that the typing strokes for average copy are increased 35 or more per second.

It is a still further object of the invention to provide a novel mounting for type levers capable of withstanding high speed operation.

It is a further object of the invention to provide a printer of the class described in which the type levers are power operated, both in the printing stroke and in their return to rest in the type basket.

Further objects and advantages of the invention will become apparent as the specification is read in light of the drawings forming a part hereof, in which drawings like reference numerals indicate like parts, and in which:

Fig. 5 is a sectional view on line 5—5 of Fig. 2, illustrating a Geneva drive mechanism;

Fig. 6 is a sectional view on line 6—6 of Fig. 5;

Fig. 7 is a vertical sectional view through the type bar mechanism and its drive and control structures;

Fig. 8 is a sectional view on line 8—8 of Fig. 7;

Fig. 9 is a sectional view on line 9—9 of Fig. 8;

Figs. 10, 11 and 12 show the mechanism of Fig. 9 in various operational positions;

Figure 1:
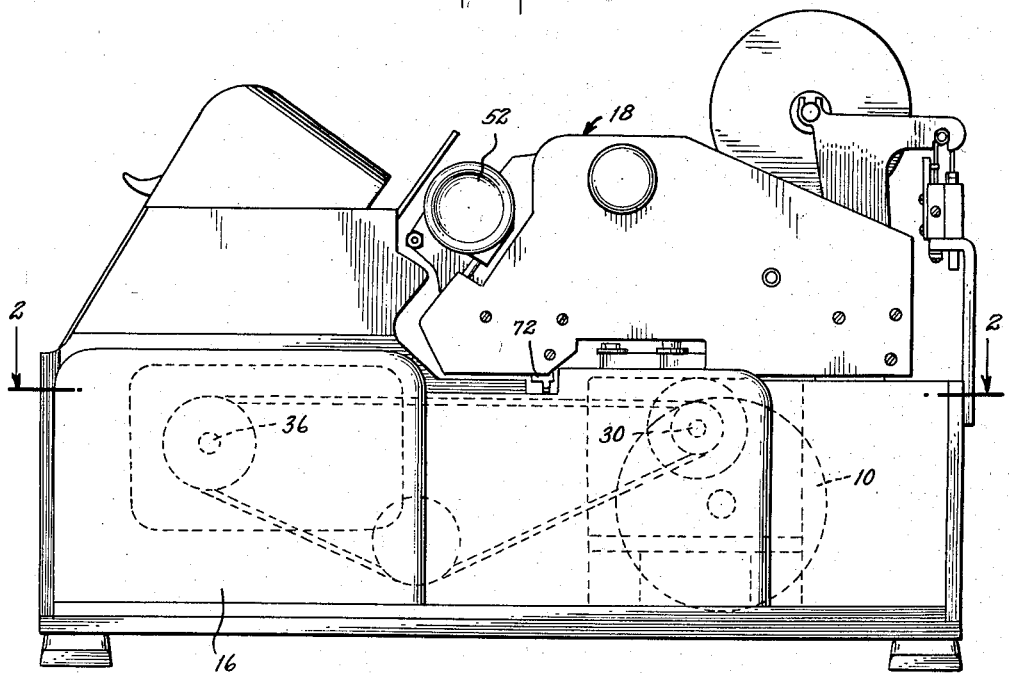
Fig. 1 is a side elevational view of the power driven printer according to an embodiment of the invention.

The power for driving the printer is derived from a motor 10 and is transmitted through an escapement drive unit 12 and an electromagnetic clutch unit 14. The relationship of the motor, the escapement drive unit and the electromagnetic clutch unit may be seen in Figs. 3 and 4. The main frame 16 of the printer serves as a housing for these units and as a support for a movable carriage 18 as seen in Fig. 1.

The escapement drive unit 12 and the electro-magnetic clutch unit 14 are so constructed and arranged as to positively drive the carriage 18 in both forward and return directions. The details of the drive assembly are fully shown in my above-noted application for United States patent. The motor 10 is adapted to impart uni-directional rotation to a motor shaft 20 which is connected by means of a flexible coupling 22 to a drive shaft 24. The drive shaft 24 is mounted for rotation in suitable antifriction bearings and has fixed to its distal end a drive shaft piston 26. The drive shaft pinion 26 meshes with an intermediate gear 28, which is fixed to the inner end of a pulley shaft 30 which is suitably journalled for rotation.

Figure 2:
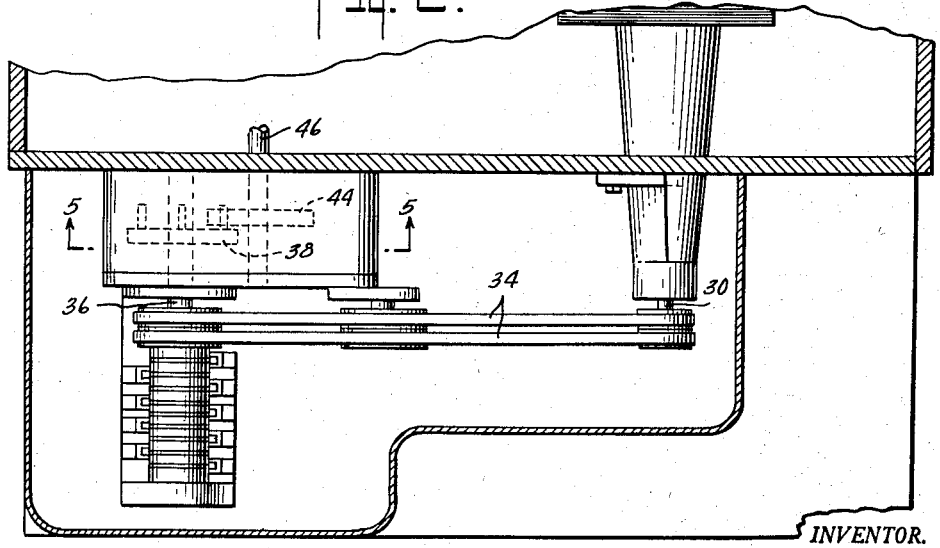
Fig. 2 is a sectional view on line 2—2 of Fig. 1 showing, in plan, a power transmission system and related mechanism.
Figure 3:
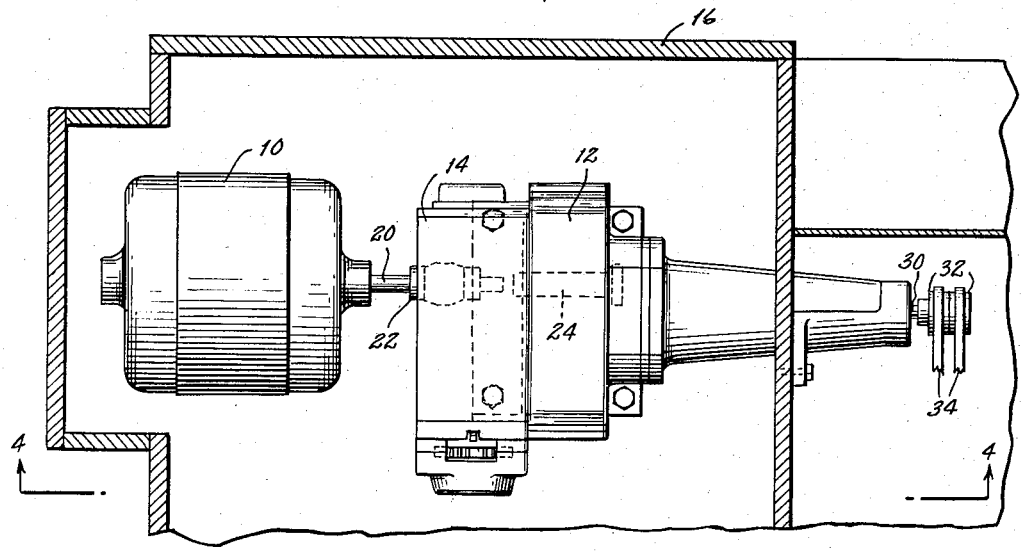
Fig. 3 is a horizontal section through the rear part of the frame and casing showing, in plan, certain of the drive mechanism.
Figure 4:
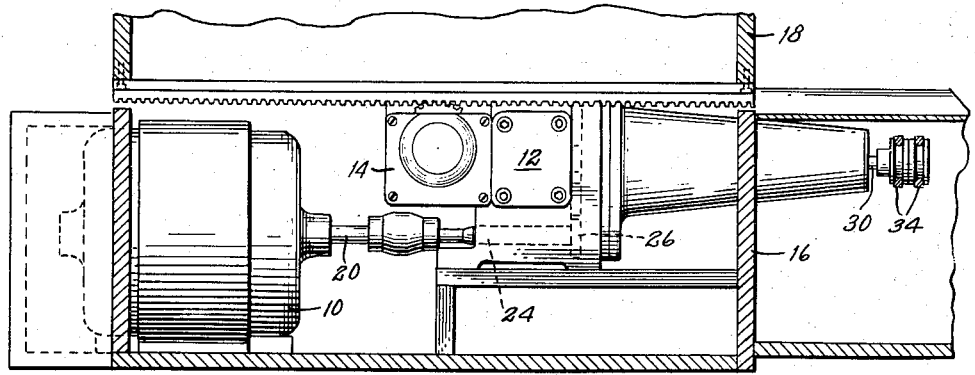
Fig. 4 is a view on line 4—4 of Fig. 3, showing the drive mechanism in end elevation.

By reference to Fig. 3, it will be seen that the pulley shaft 30 extends transversely beyond the side of the printer frame 16 where it has fixed thereto a pair of V-drive pulleys 32. These pulleys accommodate a pair of drive belts 34 for driving a shaft 36 (Fig. 2) through which power is transmitted to a Geneva drive which is illustrated in some detail in Figs. 5 and 6. The shaft 36 has fixed thereto a Geneva pin plate 38 which has four pins 40 extending from the inner face thereof. The pins 40 are adapted to engage respective slots 42 in a Geneva disc 44. The Geneva disc is fixed to a power shaft 46, the power shaft 46 extending transversely of the printer frame in the area of the type action mechanism. Figs. 7 and 8 show the position of the power shaft 46.

It has been stated heretofore that one of the objectives of the invention is the positive drive of the type levers at all times, i.e., each type lever is not only positively driven into printing engagement, but it is positively driven to its normal inactive position in the type basket. To obtain an understanding of the mechanisms resulting in this function, reference should be had to Figs. 7 through 12.

A complement of type levers 48 is mounted in a type basket 50 such that each type lever can be rotated into and out of a common printing position with respect to a platen 52 mounted on the carriage 18. The speed at which the type levers are adapted to operate precludes the use of a conventional segment wire for mounting the type levers in the type basket. Consequently, this invention contemplates an improved means for mounting the individual type levers in the type basket such that the operational strain of the positive drive can be successfully absorbed.

Figure 13:
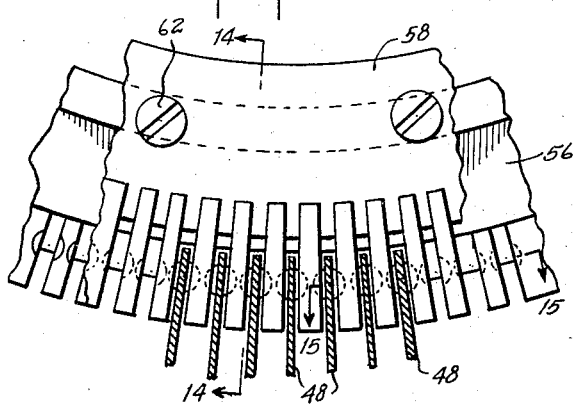
Fig. 13 is a fragmentary plan view of a type basket or segment taken on line 13—13 of Fig. 7.
Figure 14:
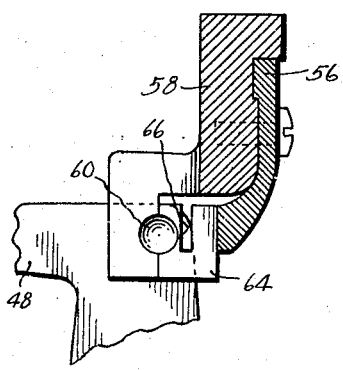
Fig. 14 is a sectional view on line 14—14 of Fig. 13.
Figure 15:
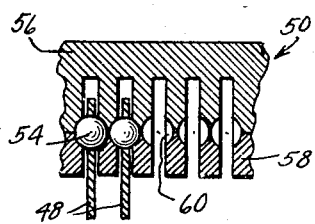
Fig. 15 is a sectional view on line 15—15 of Fig. 13.

Figs. 13 through 15 show type lever and type basket structures adapted to this end. Each of the type levers 48, as best seen in Fig. 15, has a pivot point in the type basket 50 consisting of a small ball 54 which is swaged into an eye at the inner end of the type lever. The type basket is segmental in form as in the usual typewriter structure and consists of a base segment 56 and a locking segment 58. Each of the segments 56 and 58 has complementary hemispherical concavities forming a bearing pocket 60 (Fig. 14) for the type lever bearing balls 54. The bearing balls 54 of a complement of type levers are seated in the concavities of the base segment 56 and are there held in place by the locking segment 58 which is fixed to the base segment 56 by means of a series of screws 62.

In a machine adapted to high speed operation, such as the present machine, it is important that each of the type levers be retained in the type basket under substantially the same amount of pressure. In order to accomplish this particular result, the locking segment 58 and particularly that part which engages the pivot balls 54 assumes the form of a rim 64 (Fig. 14) which has a slot 66 milled therein thereby imparting a degree of resilience to the rim 64 under which the type lever pivot balls 54 are engaged.

By reference to Fig. 7, it can be seen that each of the type levers 48 has formed at the pivot end thereof a gear segment 68. Each type lever gear segment 68 is constantly in engagement with mating teeth 70 of a related bell crank 72. It may be seen, therefore, that whenever the bell crank 72 of Fig. 7 is rotated in a counterclockwise direction, the type lever 48 which is associated therewith, will be rocked in a clockwise direction which is the printing stroke. When the bell crank 72 is rocked in a clockwise direction, the type lever associated therewith will be rocked in a counterclockwise direction thereby returning the type lever to its normal inoperative position of rest against a type lever stop 74. The mechanism by which the bell cranks 72 are operated and controlled will now be described. In this connection, it is to be understood that each type lever of the entire complement of type levers is operated by a bell crank assembly such as that shown in Fig. 7.

The bell crank 72 is mounted for rocking movement on a bell crank shaft 76 and associated with this bell crank is a drive plate 78 fixed for rotation with the power shaft 46. Extending from one face of the drive plate 78 are a pair of drive pins 80 and 82. These drive pins are adapted to cooperate with elements of the bell crank 72 to drive the bell crank in the manner heretofore described.

The bell crank assembly is best understood by reference to Fig. 9 in which it is seen that the bell crank 72 carries a bell crank latch 84, a guide plate 86, a stop pawl 88 and a pair of lugs 90 and 92. The bell crank latch 84 is pivoted on the bell crank 72 by means of a pivot pin 94. The bell crank latch 84 is biased about the pivot pin 94 in a counterclockwise direction by means of a spring 96 which extends between the free end of the bell crank latch 84 and the bell crank 72. The bell crank latch 84 is normally held in retracted position, as shown in Figs. 7 and 9, by a bell crank trip lever 98. The bell crank trip lever 98 is pivoted on a trip lever shaft 100 about which it is normally biased in a counterclockwise direction by a spring 102 connecting the upper end of the bell crank trip lever 98 with a casing 104 in which the bell crank assembly is located. The bell crank trip lever is generally L-shaped and has an inwardly extending leg 106, which at its free end has a downwardly extending finger 108 adapted to engage a latch point 110 at the lower end of the bell crank latch 84. While the finger 108 and the latch point 110 are engaged as shown in Figs. 7 and 9, the bell crank latch 84 will be in its retracted position against the tension of the spring 96.

It has been stated heretofore that the power shaft 46 is rotating constantly with the result that the drive plates 78 also rotate constantly. So long as the bell crank latch 84 is in its retracted position, the pins 80 and 82 of the associated drive plate 78 will rotate freely in respect to the bell crank 72. In this connection, it should be noted that the pins 80 and 82 extend into proximity to the face of the bell crank 72 such that if the bell crank latch 84 is released, the lower free end 112 of the bell crank latch will be engaged by either of these pins with the result that the bell crank 72 will be driven in a counterclockwise direction about the bell crank shaft 76.

In order to control the operation of the bell cranks there has been provided a plurality of key magnets 114, one for each bell crank, arranged in two staggered rows across the front of the printer. The key magnets are adapted for selective energization under control of a signal source such as a punched tape as more fully disclosed in my aforesaid application for United States patent. Each key magnet has a trip pin 116 in contact with an armature 118. Thus, for example, if the magnet 112 of Fig. 7 is energized, it will attract its armature 118 and thereby move the associated trip pin 116 rearwardly. The armatures 118 are normally held away from their related magnets by means of a spring 120. The trip pin 116 of Fig. 7, for example, when operated by reason of energization of its related key magnet, will rock the bell crank trip lever 98 in a clockwise direction about the trip lever shaft 100. This will serve to release the bell crank latch 84 so that its spring 96 will rotate the latch 84 in a counterclockwise direction about its pivot 94 and thereby project the free end 112 of the bell crank latch 84 into the path of the drive pin 80, for example, thereby conditioning the bell crank 72 for operation. The tension of the spring 102 which is connected to the bell crank trip lever 98 is sufficient to return the trip pin 116 to its normal inoperative position when its related armature 118 is released by the key magnet 114.

Figure 11:
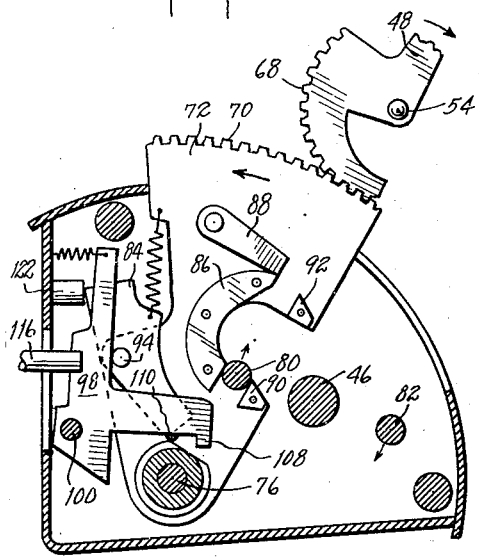
Figure 12:
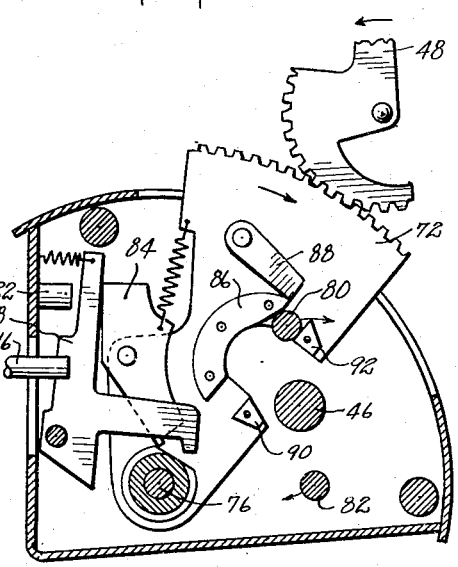

It is now possible to follow an operative cycle of a bell crank assembly and for this purpose further reference should be made to Figs. 10, 11 and 12.

As previously stated, the normal inoperative or rest position of the bell crank is that shown in Fig. 9, wherein the bell crank trip lever 98 engages the latch point 110 of the bell crank latch 84. It has also been previously stated that the trip pin 116, when projected rearwardly by its associated key magnet armature 118 will rock the bell crank trip lever 98 and release the bell crank latch 84. This is the condition of the parts illustrated in Fig. 10. It will be noted that the free end 112 of the bell crank latch 84 in Fig. 10 is now in the orbit of the drive pin 80. As the drive pin 80 is rotated in a clockwise direction, its contact with the free end 112 of the bell crank latch 84 will result in a counterclockwise movement of the bell crank 72 about the bell crank shaft 76. This movement will continue until the slot formed between lug 90 on the face of the bell crank and the adjacent end of the guide plate 86 coincides with the path of the drive pin 80. At this moment, the drive pin 80 will enter the slot, as shown in Fig. 11. At the moment the drive pin 80 is at the inner end of the slot, the bell crank 72 will have been rotated about the bell crank shaft 76 to an extent such that the type lever 48 is driven against the platen and a typing impression results. As the pin 80 continues in its orbit of movement, it will enter the slot formed between the lug 92 on the face of the segment 72 and the adjacent end of the guide plate 86. At this moment, the lug 92 is engaged by the drive pin 80 with the result that the segment 72 is now rocked in a clockwise direction about the bell crank shaft 76. This results in the counterclockwise movement of the type lever 48 such that by the time the bell crank 72 has been driven to the extent of its movement by the drive pin 80, the bell crank 72 will have been returned to the position substantially as shown in Fig. 9 and the type lever 48 will have been restored to its position against the type lever stop 74, as shown in Fig. 7.

It will be noted that the drive pin 82 has played no part in the operation of the bell crank in the cycle above described. However, since the power shaft 46 has been rotated substantially 180°, the drive pin 82 is now in position to pick up the bell crank as heretofore described. In other words, the drive pin 82 now occupies the same relative position occupied by the drive pin 80 of Fig. 9. If the bell crank latch is again in the orbit of the drive pins, the drive pin 82 will serve to drive the bell crank through the next cycle of operation. It is evident, therefore, that the bell crank and consequently the type lever can be operated twice during each revolution of the power shaft thereby greatly increasing the printing speed presently inherent in similar printers which operate a type lever only once during each complete revolution of the power shaft.

After each operative typing cycle, the bell crank 72 is relatched in its normal position of rest. This latching operation follows from the fact that the bell crank latch 84 and particularly the upper end thereof is brought into contact with a stop 122 which effectively rocks the bell crank latch in a counterclockwise direction about its pivot 94 thereby depressing the latch point 110, so that it will be engaged by the finger 108 of the bell crank trip lever 98. The elements involved in the relatching operation are conditioned for the relatching of the bell crank latch at the time the bell crank is rocked to its limit position during the typing stroke, i.e., the position corresponding generally to that shown in Fig. 11.

It can now be seen that any one of a complement of type levers can be selected for operation during any half revolution of the power shaft 46 by releasing its associated bell crank assembly for operation. Since each bell crank assembly has its individual bell crank trip lever and trip pin, the type levers may be sequentially caused to operate by selectively energizing the key magnets in the desired sequence and thereby operating a selected trip pin for controlling its related bell crank assembly.

The key magnets, one for each trip pin, are arranged in a frame along the front of the printer. These magnets, as seen in Fig. 7, are arranged in an upper and lower row, so that they can be somewhat staggered in relation to each other. Accordingly, the magnets in the upper row, as seen in Fig. 7, attract the armatures 118, whereas the magnets in the lower row attract armatures which are oppositely disposed. By way of example, it can be seen in Fig. 7, that the magnet 114a of the lower row of magnets has associated therewith an armature 118a which is pivoted on the magnet frame and biased into its released position by means of the spring 120a. A common retaining bar 116a extends across the magnet assembly and serves to limit the movement of the armatures in the outward direction. The key magnets are conventionally under control of a punched paper tape reader and code translating system, such as that shown in my Patent No. 2,461,451, issued February 8, 1949. In tape reading systems of this general category, a plurality of transversely arranged character-representing holes are sensed and the combinational code so sensed is translated to produce a single impulse representative of a character. These impulses are conducted to the key magnets of the present invention by means of suitable electrical conductors connected to the individual key magnets corresponding to the characters represented by the several impulses.

In accordance with the provisions of the patent statutes, I have herein described the principles of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

I claim:

1. In a power operated typewriter, a constantly rotatable power shaft, a drive pin carried by said power shaft, a type lever mounted for oscillation into and out of typing position, a pivot shaft mounted parallel to said power shaft, a typing segment for said type lever mounted on said pivot shaft for oscillation thereon, a gear segment on said type lever, a gear segment on said typing segment disposed in engagement with said first named gear segment, a movable abutment pivoted to said typing segment, and means for moving said abutment into the path of said drive pin, thereby coupling said typing segment with said power shaft to oscillate said typing segment on said pivot shaft.

2. In a power operated typewriter, a constantly rotatable power shaft, a drive pin carried by said power shaft, a type lever mounted for oscillation into and out of typing position, a pivot shaft mounted parallel to said power shaft, a typing segment for said type lever mounted on said pivot shaft for oscillation thereon, a gear segment on said type lever, a gear segment on said typing segment disposed in engagement with said first named gear segment, an abutment pivoted to said typing segment, means normally urging said abutment into the path of said drive pin, a latch for maintaining said abutment out of the path of said drive pin, and means for releasing said latch, thereby coupling said typing segment with said power shaft to oscillate said typing segment on said pivot shaft.

3. In a power operated typewriter, a constantly rotatable shaft, a drive pin carried by said power shaft, a type lever mounted for oscillation into and out of typing position, a pivot shaft mounted parallel to said power shaft, a typing segment for said type lever mounted on said pivot shaft for oscillation thereon, a gear segment on said type lever, a gear segment on said typing segment disposed in engagement with said first named gear segment, an abutment pivoted to said typing segment, means normally urging said abutment into the path of said drive pin, a latch for maintaining said abutment out of the path of said drive pin, and electromagnetic means for releasing said latch, thereby coupling said typing segment with said power shaft to oscillate said typing segment on said pivot shaft.

4. In a power operated typewriter, constantly rotatable power shaft, a type lever mounted for oscillation into and out of typing position, a pivot shaft mounted parallel to said power shaft, a typing segment for said type lever mounted on said pivot shaft for oscillation thereon, a positive rolling connection between said type lever and said segment whereby oscillation of said segment will oscillate said type lever, a drive pin rotatable with said power shaft and located to rotate adjacent a face of said typing segment, a movable abutment on said face of said typing segment, means for moving said abutment into the path of said drive pin whereby said segment is driven to operate said type lever into typing position, a second abutment on said typing segment engageable by said pin when said type lever is in typing position for driving said segment to move said type lever out of typing position, and means thereafter operative for holding said movable abutment out of the path of said pin.

5. In a power operated typewriter, a constantly rotatable power shaft, a type lever mounted for oscillation into and out of typing position, a pivot shaft mounted parallel to said power shaft, a typing segment for said type lever mounted on said pivot shaft for oscillation thereon, a positive rolling connection between said type lever and said segment whereby oscillation of said segment will oscillate said type lever, a drive pin rotatable with said power shaft and located to rotate adjacent a face of said typing segment, a movable abutment on said face of said typing segment, means for moving said abutment into the path of said drive pin whereby said segment is driven to operate said type lever into typing position, a second abutment on said typing segment engageable by said pin when said type lever is in typing position for driving said segment to move said type lever out of typing position, means thereafter operative to latch said movable abutment out of the path of said pin, and selective means for releasing said latching means.

6. In a power operated typewriter, a constantly rotatable power shaft, a type lever mounted for oscillation into and out of typing position, a pivot shaft mounted parallel to said power shaft, a typing segment for said type lever mounted on said pivot shaft for oscillation thereon, a positive rolling connection, between said type lever and said segment whereby oscillation of said segment will oscillate said type lever, a drive pin rotatable with said power shaft and located to rotate adjacent a face of said typing segment, a movable abutment on said face of said typing segment, means for moving said abutment into the path of said drive pin whereby said segment is driven to operate said type lever into typing position, a second abutment on said typing segment engageable by said pin when said type lever is in typing position for driving said segment to move said type lever out of typing position, a latch thereafter operative for holding said movable abutment out of the path of said pin, and electromagnetic means for releasing said latch.

7. In a power operated typewriter, a constantly rotatable power shaft, a type lever mounted for oscillation into and out of typing position, a pivot shaft mounted parallel to said power shaft, a typing segment for said type lever mounted on said pivot shaft for oscillation thereon, a positive rolling connection between said type lever and said segment whereby oscillation of said segment will oscillate said type lever, a pair of drive pins rotatable with said power shaft and located to rotate adjacent a face of said typing segment, a movable abutment on said face of said typing segment, means for moving said abutment into the path of one of said drive pins whereby said segment is driven to operate said type lever into typing position, a second abutment on said typing segment engageable by said one pin when said type lever is in typing position for driving said segment to move said type lever out of typing position, and means thereafter operative to withdraw said abutment from the path of said pins before the second of said pins is rotated into contact therewith.

8. In a power operated typewriter, a constantly rotatable power shaft, a type lever mounted for oscillation into and out of typing position, a pivot shaft mounted parallel to said power shaft, a typing segment for said type lever mounted on said pivot shaft for oscillation thereon, a positive rolling connection between said type lever and said segment whereby oscillation of said segment will oscillate said type lever, a drive pin rotatable with said power shaft and located to rotate adjacent a face of said typing segment, a pivoted abutment on said face of said typing segment, a spring normally urging said abutment into the path of said drive pin whereby said segment is rocked about said pivot shaft in one direction to operate said type lever into typing position, a fixed abutment on said typing segment engageable by said pin when said type lever is in typing position for rocking said segment about said pivot shaft in the other direction to move said type lever out of typing position, and a latch thereafter operative for holding said pivoted abutment out of the path of said pin.

9. In a power operated typewriter, a constantly rotatable power shaft, a type lever mounted for oscillation into and out of typing position, a pivot shaft mounted parallel to said power shaft, a typing segment for said type lever mounted on said pivot shaft for oscillation thereon, a positive rolling connection between said type lever and said segment whereby oscillation of said segment will oscillate said type lever, a drive pin rotatable with said power shaft and located to rotate adjacent a face of said typing segment, a pivoted abutment on said face of said typing segment, a spring normally urging said abutment into the path of said drive pin whereby said segment is rocked about said pivot shaft in one direction to operate said type lever into typing position, a fixed abutment on said typing segment engageable by said pin when said type lever is in typing position for rocking said segment about said pivot shaft in the other direction to move said type lever out of typing position, a latch thereafter operative for holding said pivoted abutment out of the path of said pin, and selective means for releasing said latch to render said type lever operative.

10. In a power operated typewriter, a constantly rotatable power shaft, a type lever mounted for oscillation into and out of typing position, a pivot shaft mounted parallel to said power shaft, a typing segment for said type lever mounted on said pivot shaft for oscillation thereon, a positive rolling connection between said type lever and said segment whereby oscillation of said segment will oscillate said type lever, a drive pin rotatable with said power shaft and located to rotate adjacent a face of said typing segment, a pivoted abutment on said face of said typing segment, a spring normally urging said abutment into the path of said drive pin whereby said segment is rocked about said pivot shaft in one direction to operate said type lever into typing position, a fixed abutment on said typing segment engageable by said pin when said type lever is in typing position for rocking said segment about said pivot shaft in the other direction to move said type lever out of typing position, a latch thereafter operative for holding said pivoted abutment out of the path of said pin, and electromagnetic means for releasing said latch to render said typing lever operative.

References Cited in the file of this patent

UNITED STATES PATENTS

| | | |
|---|---|---|
| 1,785,999 | Bryce | Dec. 23, 1930 |
| 1,924,140 | Von Reppert | Aug. 29, 1933 |
| 2,119,928 | Salzberger | June 7, 1938 |